_United States Patent Office_ 3,345,843
Patented Oct. 10, 1967

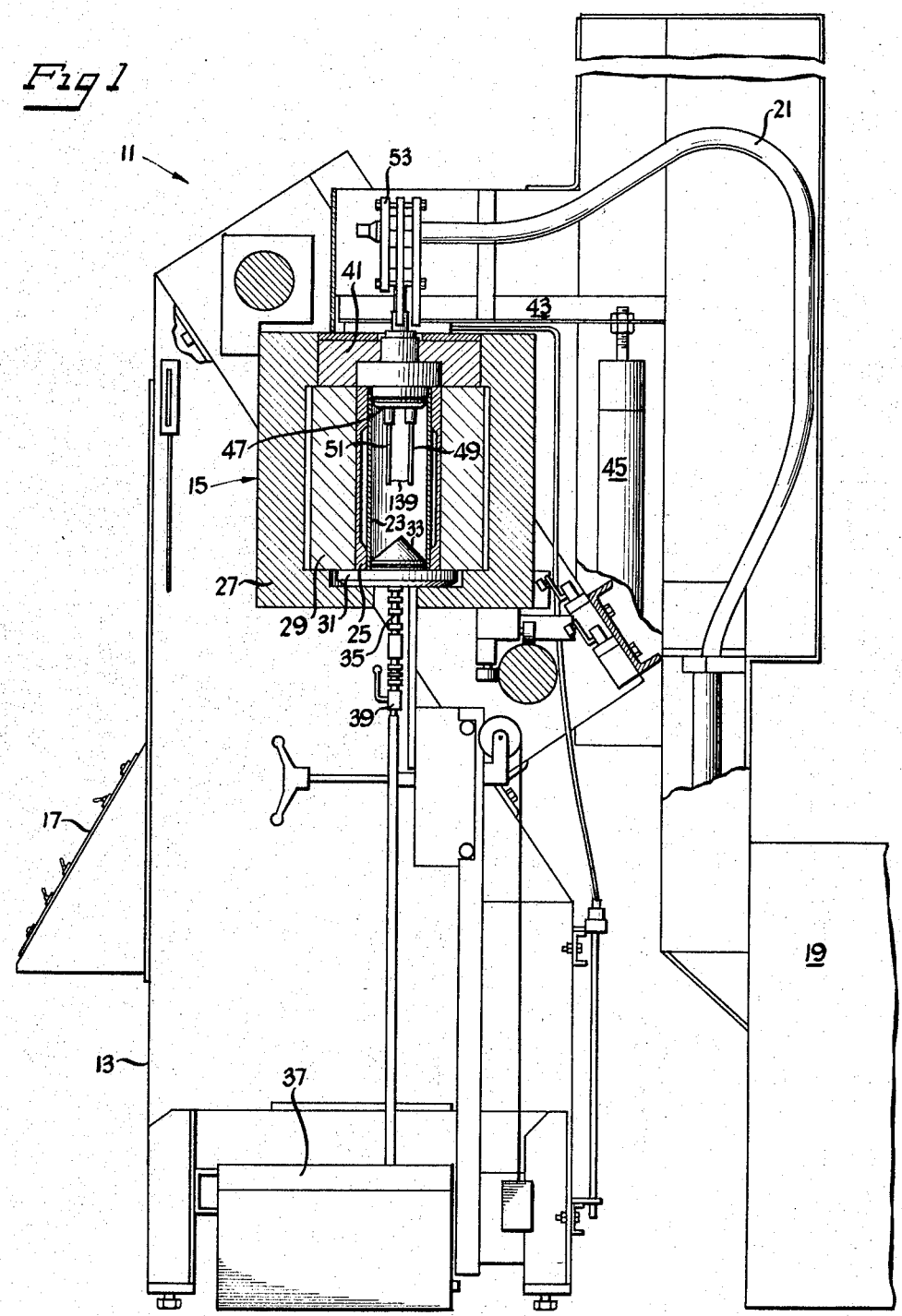

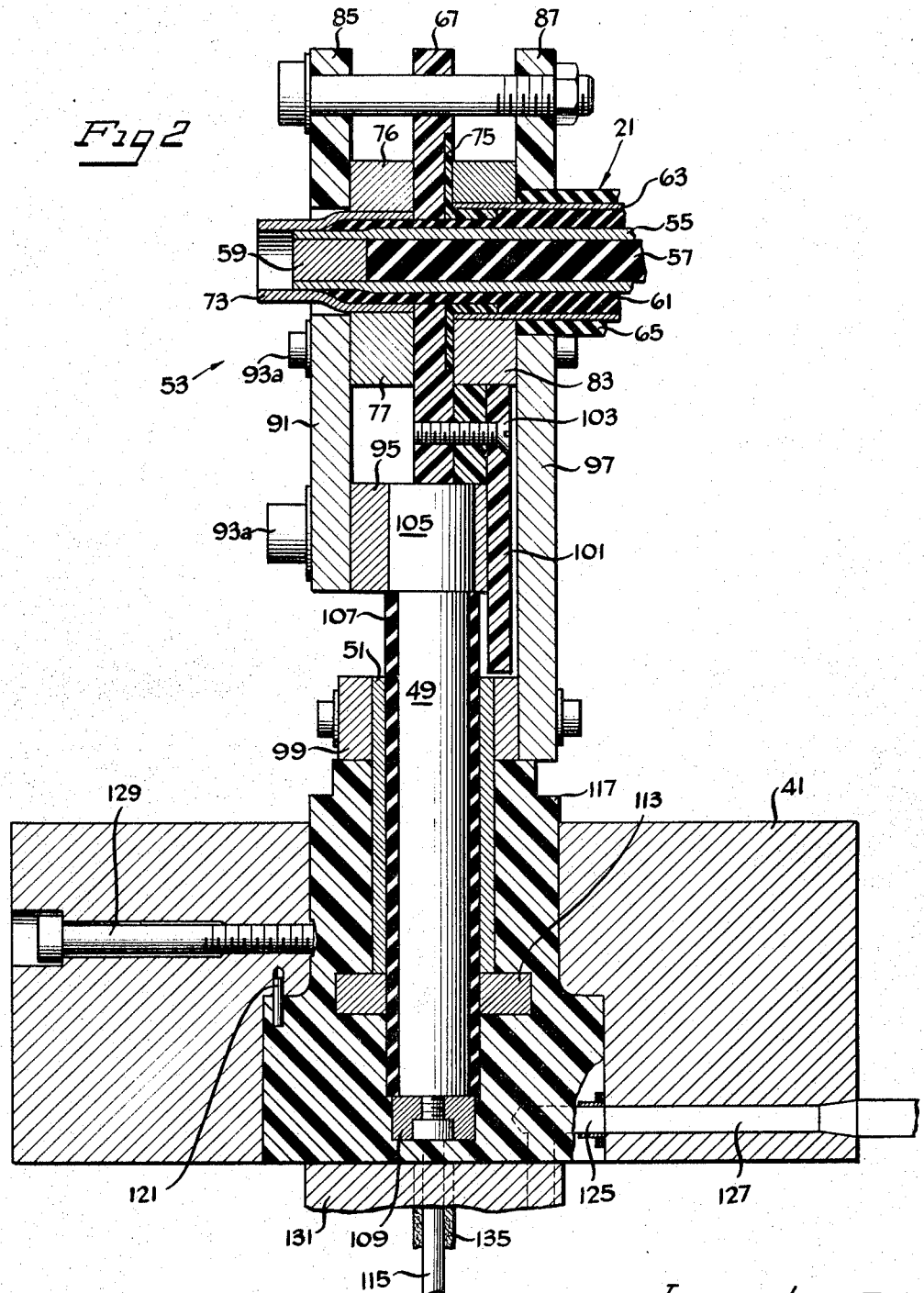

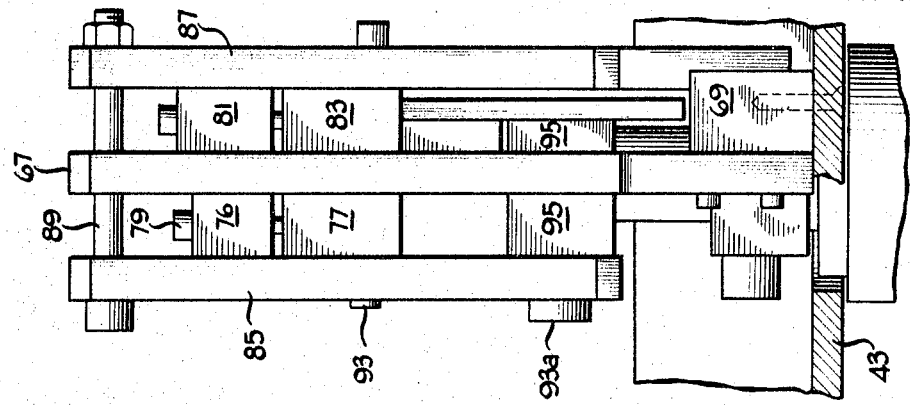
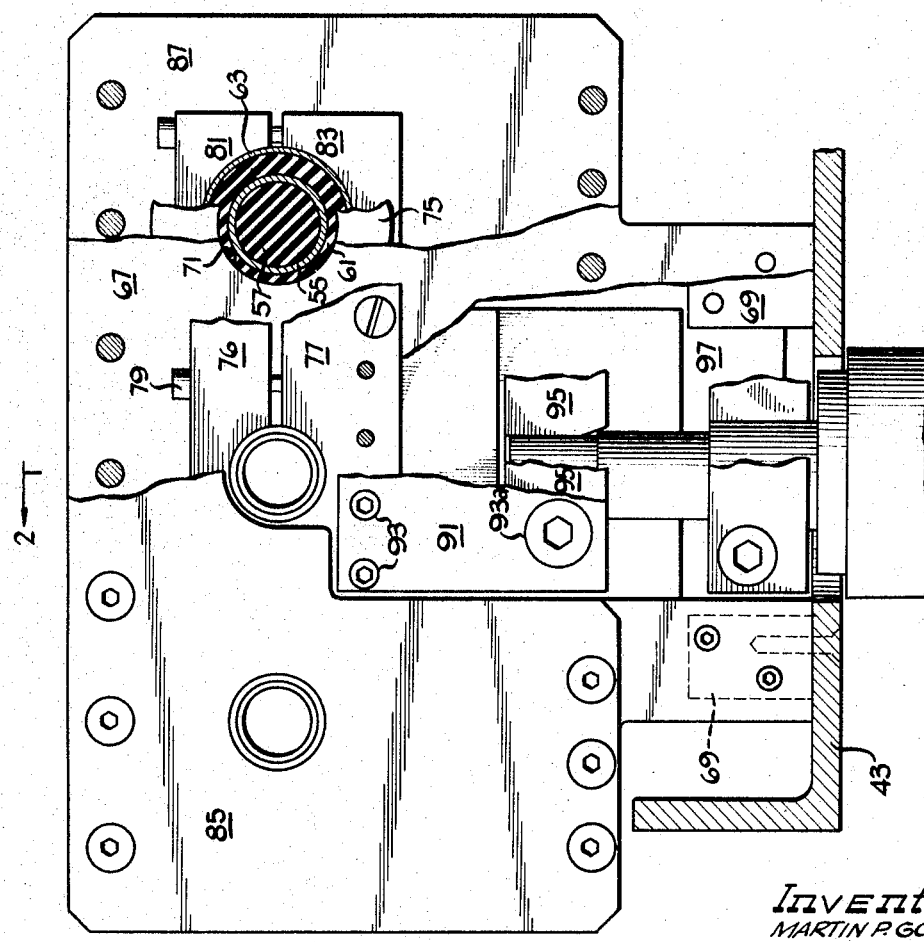

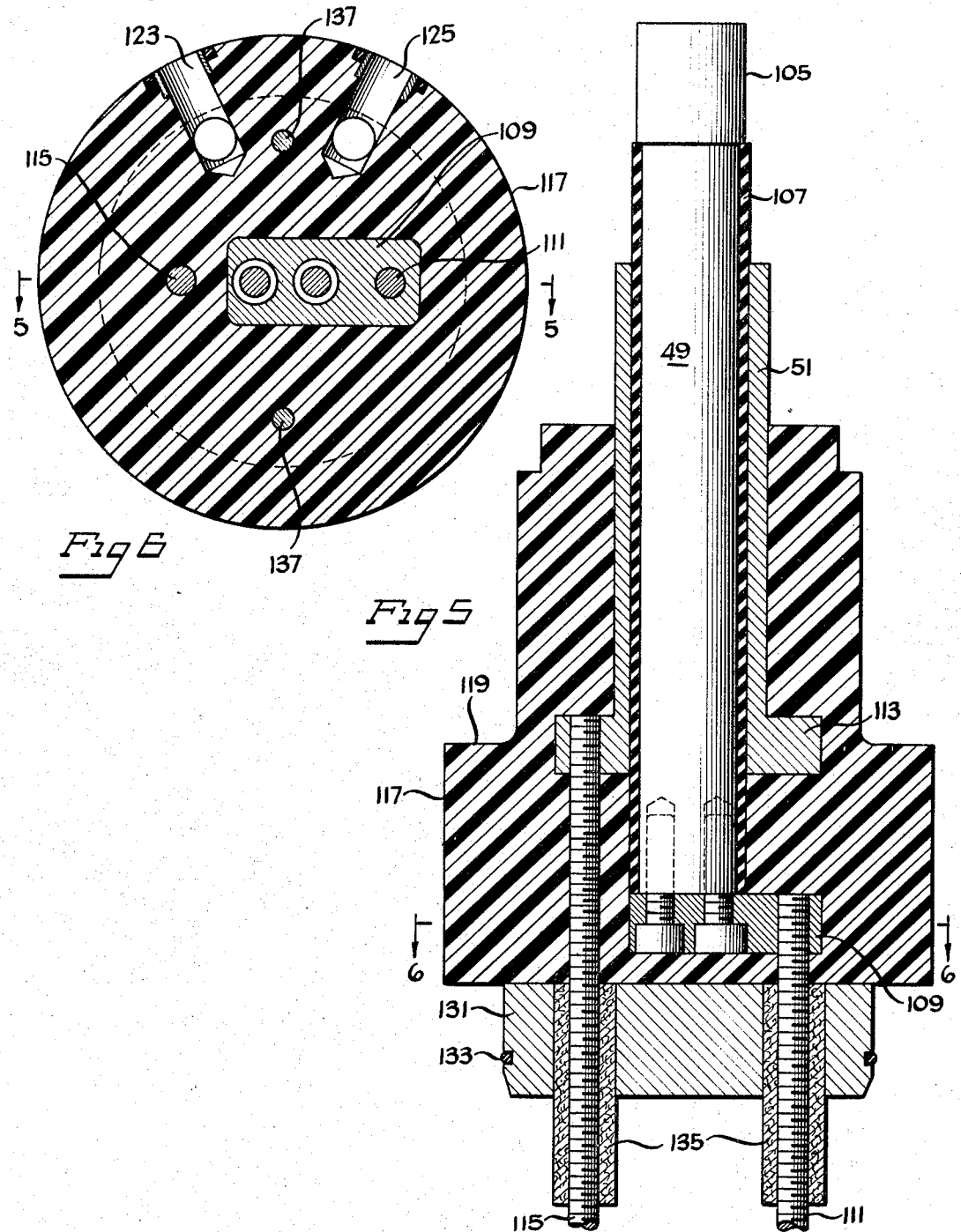

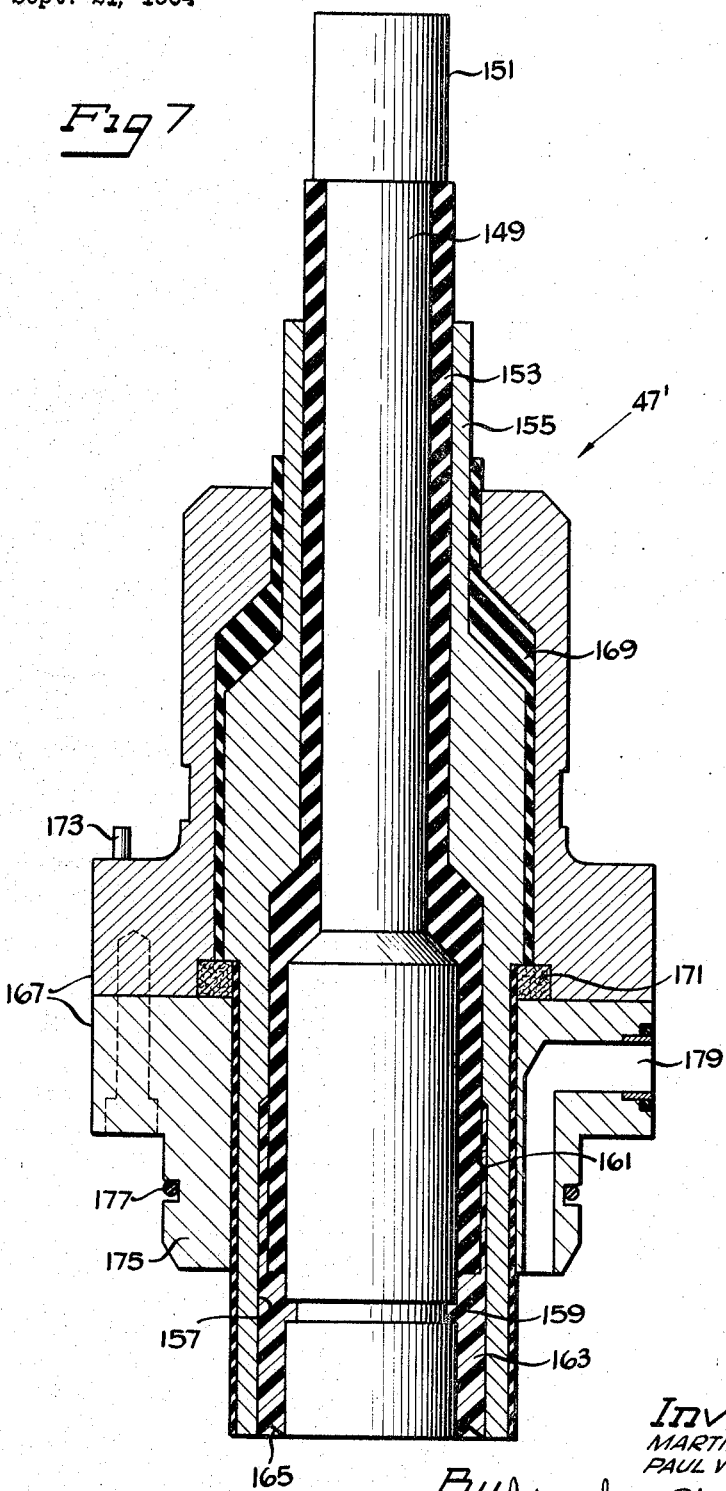

3,345,843
FORMING APPARATUS
Martin P. Golden, Del Mar, and Paul Wildi, San Diego, Calif., assignors to General Dynamics Corporation, New York, N.Y., a corporation of Delaware
Filed Sept. 21, 1964, Ser. No. 397,961
5 Claims. (Cl. 72—56)

This application relates generally to the forming of material and more particularly to electrohydraulic forming. Specifically, the application is directed to novel electrode assemblies useful in an electrohydraulic forming process.

In recent years, a forming process has been developed which is known as electrohydraulic forming. In this process, electric energy, which is built up at a relatively slow rate in a condenser bank, is suddenly discharged between a pair of electrodes which are immersed in a liquid, usually water. This sudden discharge of electric energy across an electrode gap produces a pressure pulse, or sound wave, which propagates radially from the line of action of the spark across the gap. This high rate of propagation of the wave, initially exceeding the velocity of sound in the particular medium, is responsible for a shock wave of high energy. The shock wave so produced is used to force a blank, for example a flat sheet or a tube, into a die. By regulating the charge built up on the condenser bank, the deforming force created can be precisely controlled. Thus, the amount of force can be easily varied, and only sufficient force to produce a particular shape need be applied.

It is a principal object of the present invention to provide novel electrode assemblies for use in electrohydraulic forming. It is another object of the present invention to provide electrode assemblies for electrohydraulic forming which incorporate means for filling the forming cavity with liquid. It is a further object to provide interchangeable electrode assemblies which can be substituted for each other in an electrohydraulic forming machine so as to efficiently produce sparks suitable for carrying out different types of forming operations. It is a still further object to provide electrode assemblies which are simple in construction and which can efficiently create high voltage electrical discharges. These and other objects of the invention are more particularly set forth in the following detailed description and in the accompanying drawings wherein:

FIGURE 1 is a right side elevational view, partly broken away and partly in section, of an electrohydraulic forming apparatus embodying various features of the invention;

FIGURE 2 is an enlarged sectional view of a portion of the apparatus shown in FIGURE 1, taken generally along line 2—2 of FIGURE 3;

FIGURE 3 is a fragmentary front view, partially broken away of the portion of the apparatus shown in FIGURE 2;

FIGURE 4 is a right side elevational view of FIGURE 3;

FIGURE 5 is an enlarged sectional view of the electrode assembly shown in FIGURE 1;

FIGURE 6 is a sectional view taken along line 6—6 of FIGURE 5; and

FIGURE 7 is an enlarged sectional view, similar to FIGURE 5, of an alternate embodiment of an electrode assembly.

In FIGURE 1, an electrohydraulic forming apparatus 11 is shown which illustrates one type of apparatus in which the subject matter of the invention is useful. The electrohydraulic forming apparatus 11, which is described in detail in U.S. patent application Ser. No. 397,737, filed Sept. 21, 1964, and assigned to the assignee of this application, includes an overall supporting frame 13 which carries a generally centrally located die assembly 15 suitable for electrohydraulic forming. A control panel 17 is provided in the front of the apparatus 11 to control the various steps of the forming operation. An energy storage unit 19, as for example a bank of condensers, is provided at the rear of the apparatus 11 which is suitable for storing a high voltage charge of energy. Power transmission cables 21 lead from the energy storage unit 19 to the upper portion of the die assembly 15.

The illustrated die assembly 15 is designed for expansion-forming a tubular workpiece 23 to provide an elongated expanded portion therein intermediate its ends. Accordingly, the die assembly 15 includes a pair of vertically-split die halves 25 which are carried in a pair of complementary die holders 27. Suitable inserts 29 are provided in each of the die holders 27 to adapt them to the particular configuration of the die halves 25. The die holders 27 are suitably mounted on the support frame 13 of the apparatus for horizontal movement between a closed or forming position, illustrated in FIGURE 1, a separated or loading-unloading position wherein the die halves 25 are spaced horizontally apart from each other.

In the illustrated apparatus, a stationary bottom die plate 31 is provided which is suitably secured to the supporting frame 13. As can be seen in FIGURE 1, the lower portions of the complementary die holders 27 are recessed so that they fit around the bottom plate 31 without interferring therewith. Depending upon the particular forming operation being carried out, a suitable adapter 33 may be positioned on the upper surface of the bottom plate 31. In the illustrated die assembly 15 in which a tubular workpiece 23 is being formed, a lower adapter 33 is suitably secured upon the upper surface of the bottom plate 31. The lower adapter 33 may be of circular cross-section or may be shaped to preferentially reflect the shock wave.

During the forming operation, the tubular workpiece 23 is substantially filled with liquid, usually water. An O-ring disposed in the side wall of the lower adapter 33 provides a suitable seal at the bottom of the tubular workpiece 23. So that the liquid may be easily removed from the die assembly 15 after forming, a drain hole is provided in the adapter 33 that lines up with a similarly positioned drain hole which extends vertically through the bottom plate 31. A depending drain pipe 35 leads from the bottom plate 31 to a lower drain pan 37. An appropriate valve 39 is included in the drain pipe 35 which can be opened manually, or automatically from the control panel 17, upon completion of the forming operation and then closed after the completion of draining.

A die head 41 is provided which surmounts the split die halves 25 and serves as the top of the die cavity. The die head 41 is suitably bolted to a supporting channel 43 which is attached, in cantilever fashion, to a vertically operable pneumatic cylinder 45. Operation of the pneumatic cylinder 45 raises and lowers the die head 41.

Disposed generally centrally within the die head 41 is an electrode head assembly 47 which includes a pair of electrodes 49 and 51 between which the electrical discharge for the forming operation occurs. Surmounting the electrode head assembly 47 is an electrode terminal assembly 53 through which the electrode head assembly 47 is connected to the power transmission cables 21.

The electrode terminal assembly 53 is suitably mounted on the supporting channel 43 above the die head and is a fixed part of the apparatus 11. The electrode head assembly 47, however, may be changed to best suit the particular forming operation to be performed. Thus, alternate electrode head assemblies, interchangeable with one another, are provided for use with one apparatus 11.

Electrode head assembly 47 is designed particularly for use in the described expansive forming operation upon a tubular workpiece. In FIGURE 7, an alternate electrode head assembly 47' is illustrated, to be described hereinafter.

The electrode terminal assembly 53, best seen in FIGURES 2, 3 and 4, serves as a junction between the power transmission cables 21 and the electrode head assembly 47. To keep the losses due to resistance and to inductance in a high voltage operation such as this at an acceptably low level, a plurality of coaxial high voltage transmission cables 21 are preferably employed. In the illustrated apparatus 11, three cables 21 are used. Moreover, because the cables are subjected to repeated flexing as a result of the raising and lowering of the die head 41, the flexibility of small size cables gives them preference over a single cable large enough to carry the entire load, which would be significantly less flexible.

As best seen in FIGURE 2, each of the high voltage transmission cables 21 includes a hollow, electrically conductive conduit 55 of a suitable material having the required flexibility, such as braided copper, which conduit serves as the high voltage lead. A flexible rod 57 of insulation fills the bore of the hollow conduit 55. The end of the conduit 55 is filled with a brass plug 59. An outer tubular layer 61 of high voltage insulation surrounds the tubular high voltage lead. Adjacent the outer surface of the tubular insulation 61 is a second flexible, electrically conductive conduit 63 which serves as the ground lead. An outer sheath 65 of heavy insulating material covers the ground lead and completes the coaxial cable 21.

A vertically disposed, center mounting plate 67 of a high strength insulating material, such as epoxy resin, serves as the main supporting member for the electrode terminal assembly 53. As best seen in FIGURES 3 and 4, the plates 67 has a portion cutout centrally of its bottom and is supported by mounting blocks 69 which flank this cutout and are secured to the center plate 67 by socket screws. The mounting blocks 69 contain tapped, vertically extending holes through which they are affixed to the supporting channel 43 by machine screws extending upward therethrough. Three horizontally aligned positioning holes 71 are provided in the center plate 67, in which holes the three coaxial cables 21 are mounted.

As shown in FIGURE 2, only the inner high voltage lead 55 extends through the center insulating plate 67, the ground lead 63 terminating rearward of it. A tubular terminal 73 is connected to the high voltage lead 55 on the front side of the center insulating plate 67. In the illustrated embodiment, the end of the high voltage terminal 73 is swaged, as by magnetic forming, onto the high voltage conduit 55 and its interior brass plug 59.

A circular recess is provided in the rear surface of the center plate 67, concentric with each of the positioning holes 71. The flange portion of a flanged nipple 75, made of a rigid insulating material, is accommodated within this circular recess. The tubular section of the nipple 75 occupies a suitable recess which is cut out of the relatively thick insulating layer 61 of the cable. The ground lead 63 extends over the tubular portion of the nipple to its base at the flange and interiorly supports the ground lead so that electrical connection there to is facilitated.

Interconnection of the three high voltage lead terminals 73 is accomplished via a pair of electrically conductive split clamping blocks 76 and 77 which contain mating semicircular apertures that accommodate the high voltage terminals. These front clamping blocks 76 and 77 lie adjacent the front face of the center insulating plate 67 and are connected to each other by socket head bolts 79. A pair of similar split clamping blocks 81 and 83 disposed adjacent the rear face of the center plate 67 interconnect the three ground leads 63 of the three coaxial cables 21. Front and rear cover plates, 85 and 87 respectively, which are made of electrically insulating material, for example fiberglass-filled epoxy, define the outside of the assembly and are suitably interconnected by a plurality of bolts 89 which extend through both cover plates and through the center insulating plate 67. Central cutouts at the bottom of both the cover plates 85 and 87 provide space wherein the electrical connections to the electrode head assembly 47 are made.

A front connector plate 91 of electrically conductive material is bolted near its top to the lower front clamping block 91. The bolts 93 extend inward through the front clamping blocks 77 into the center plate 67 and thus also aid in stabilizing the assembly. Connection is made to the electrode head assembly 47 at the lower end of the front connector plate 85. Bolts 93a extend through drilled holes in the front connector plate 91 and clamp together forward and aft pieces of an upper electrode clamp 95 which has a vertically disposed cylindrical hole into which the electrode 49 interfits.

A rear connector plate 97 of electrically conductive material is bolted near its top portion to the lower rear clamping block 83. As best seen in FIGURE 2, the rear connector plate 97 is longer than the front connector plate 91 and extends further downward. Near its lower end, the rear connector plate 97 is similarly bolted to a lower electrode split clamp 99 having therein a vertically disposed cylindrical hole of larger diameter than the upper electrode clamp 95. To assure the rear connector is suitably insulated, an intermediate insulating plate 101 is disposed between the upper electrode clamp 95 and the rear connector plate 97, being secured in position, as by nylon screws 103.

The electrode head assembly 47 includes the high voltage electrode 49 in the form of a center conductor or rod made of a suitable material, such as copper. An upper portion 105 of enlarged diameter (see FIG. 5) is secured within the upper clamp 95. The entire lateral surface of the remainder of the center conductor is covered with a suitable high voltage insulation. A wrapping 107 of about three layers of Mylar tape impregnated with epoxy resin is considered suitable for most operations. An offset bar 109 secured to the lower face of the center connector, as by bolts screwed into two axially extending tapped holes in the bottom of the center connector. A tapped hole in the bar 109, which is made of a suitable conductive material such as copper, allows the upper threaded end of a positive electrode extension 111 to be screwed thereinto and supported in depending relation.

The ground electrode 51 is in the form of an outer sleeve of a conductive material, such as copper, which is disposed about the wrapping of insulation 107. The sleeve is coaxial with the center conductor and is thus spaced uniformly from the positive electrode 49. The upper end of the ground electrode 51 is secured in the lower clamp 99. A supporting ring 113 is suitably secured, as by brazing, to the lower end of the sleeve. A tapped hole in the ring 113 allows the threaded upper end of the ground electrode extension 115 to be threaded thereinto and supported in depending relation.

After the threaded connections to the electrode extensions 111 and 115 have been made, the electrode head assembly 47 is completed by potting the entire lower portion of it in a casting 117 of a suitable insulating material, such as a polyurethane-epoxy resin. The casting 117 makes the electrode head assembly 47 into a single easy-to-handle unit which facilitates the interchanging of electrode head assemblies. The casting 117 is proportioned to fit into the shape of the opening which is provided in the die head 41. The shape of the casting is designed so that the casting has a shoulder 119 generally intermediate its length in which an upstanding positioning pin 121 (FIG. 2) is disposed. When the casting 117 is inserted into the die head 41 and the pin 121 is aligned with a suitable drilled hole therein, the desired orientation of the electrode extensions 111 and 115 within the die cavity is assured.

In the illustrated die assembly 15, the interior of the tubular workpiece 23 is filled with liquid before the forming step. A water inlet passageway 123 (see FIG. 6) is provided by drilling horizontal and vertical intersecting holes in the casting 117. To vent the air from the cavity as the liquid fills it, a second similar pair of intersecting holes are drilled to provide a vent passageway 125. When the electrode head assembly 47 is aligned in the die head 41 with the positioning pin 121 in its proper position, the horizontally extending upper ends of the inlet passageway 123 and the vent passageway 125 are aligned with connecting service passageways 127 provided in the die head. The casting 117 is held in place in the die head 41 by a horizontal set screw 129 (FIG. 2).

To assure that the upper end of the tubular workpiece 23 is properly positioned with respect to the electrodes and to seal the upper end of the tube which will be filled with liquid during the forming process, an upper adapter 131 is secured to the lower face of the casting 117. The adapter 131 is made of a suitable material, such as stainless steel, which shields the casting 117 from the shock wave generated within the forming chamber. The upper adapter 131 may be of circular cross-section or may be shaped to preferentially reflect the shock wave. The upper adapter 131 carries a suitable sealing O-ring 133 which is seated in a groove cut in its outer surface. Insulating sleeves 135 of a suitable material, such as fiber glass, are disposed about the upper ends of each of the electrode extensions 111 and 115 so that the adapter 131 does not short circuit them. The adapter is suitably mounted, as by a pair of bolts 137 extending upward into tapped holes in the bottom face of the casting. Suitable drilled holes are likewise provided in the adapter 131 which line up with the inlet and vent passageways in the casting 117.

In the illustrated embodiment, the electrode extensions 111 and 115 are quarter-inch rods of a suitable material, such as steel, and are spaced about 1¾ inches apart, center-to-center. The electrode head assembly 47 of these proportions is designed to be used with voltages between about 1,000 volts and about 15,000 volts. To bridge this gap between the lower ends of the electrode extensions 111 and 115, a thin bridge wire 139 (see FIG. 1) is supported between the positive electrode 49 and the ground electrode 51. The bridge wire 139 may be of any suitable cross-section, such as circular, rectangular, etc. When the workpiece 23 is placed in position and filled with liquid, the energy storage unit 19 is discharged through the electrodes, the high voltage pulse exploding the bridge wire 139 and thereby generating the necessary force within the liquid-filled tube to electrohydraulically form the tubular workpiece 23 into its surrounding exterior die cavity.

As previously stated, to best accomplish different types of forming operations, different electrode configurations are desired. It is apparent that the length, the size and the spacing between the electrode extensions 111 and 115, described above, may be easily altered to position the electrodes closer together or farther apart.

FIGURE 7 shows an electrode assembly 47' for producing a spark discharge. The electrode head assembly 47' includes a center high voltage electrode 149 having an upper portion 151 of enlarged diameter which is held within the upper clamp 95. The electrode 149 is longer than the central conductor section of the electrode 49 and extends downward into the cavity between the die halves 25 without an extension. The electrode 149 is suitably machined from a single piece of a suitable material, such as copper. The outer surface of the high voltage electrode 149 is covered with a high voltage insulating material 153, such as a lamination of layers of Mylar tape and epoxy resin.

The ground electrode 155, which is coaxial with the electrode 149, is generally tubular in shape. Its upper end is held in the lower electrode clamp 99. The electrode 155 is machined to fit over the insulating layer 153 that covers the high voltage electrode 149. After the ground electrode 155 has been fitted in place over the insulation 153, there is an annular chamber 157 at the very bottom into which the wrapped insulation does not extend. A circumferential notch 159 in the outer surface of the high voltage electrode 149 and an under-cut 161 in the ground electrode extend into the chamber 157. By filling the chamber 157 with a high voltage insulation material 163, such as cast epoxy resin, the assembled electrodes are united into an integral unit. A groove 165 is provided in the bottom face of the cast insulation 163 so not to interfere with the spark's jumping of the gap between the coaxial electrodes during the forming step. The groove 165 also serves to receive the forces generated by the spark discharge in such a manner as to increase the sealing between the electrodes.

This coaxial electrode unit is adapted to fit in the die head 41 by means of a two-part housing 167, made of a suitable material, such as steel or aluminum. The ground electrode 155 is coated with high voltage insulation 169. To lock the coaxial electrode unit in the housing, a support ring 171 of insulating material, such as fiber glass, is provided which is seated at the mating line between the upper and lower pieces of the housing 167. The two-piece housing is suitably bolted together. The upper housing piece carries an upstanding positioning pin 173. The lower housing piece terminates in a generally cylindrical portion 175 which may be shaped to reflect shock waves. The portion 175 carries a sealing O-ring 177 in a groove in its outer surface that forms a seal against the inside of the work piece. A liquid inlet passageway 179 and a vent passageway (not shown) are likewise provided in the bottom half of the housing 167.

An illustrative electrode head assembly 47' comprises an inner high voltage electrode about 1¼ inches in diameter at its bottom. The bottom portion of the coaxial ground electrode 155 is about 0.15 inch in thickness and is spaced about 0.17 inch from the outer surface of the positive electrode 149. This electrode assembly is designed for use in water at voltages between about 1,000 volts and about 15,000 volts. A generally annular spark discharge is provided between these coaxial electrodes.

It should be understood that various other changes and modifications that are within the skill of the art may be made to the illustrated apparatus without departing from the scope of the invention which is defined in the appended claims. For example, an electrode assembly may be provided in the bottom die plate for certain forming applications. Also, a single high voltage electrode extension may be provided in an upper electrode assembly. A thin wire depending from the electrode extension would be made long enough to touch a grounded bottom die plate.

Various of the features of the invention are set forth in the following claims.

What is claimed is:

1. In an electrohydraulic forming apparatus that includes means defining a die cavity adapted for the expansion forming of a tubular workpiece which cavity has an opening at one end thereof, the improvement comprising a die head having an opening therein which is circular in cross section and has two portions of different diameters forming a ledge in said die head opening which ledge faces said die cavity, a pair of interchangeable electrode assemblies for insertion into the cavity through the opening, each assembly including a first electrode, a second electrode coaxial with said first electrode and disposed in surrounding relation thereto and spaced uniformly therefrom, high voltage insulation disposed between said coaxial electrodes, casting means generally surrounding said coaxial electrodes which casting means is shaped to fit into said die head opening and to have a shoulder which seats against said die opening ledge, and positioning means for insertion into one end of a tubular workpiece in the die cavity and to form a liquid-tight seal at said end, said assembly including a liquid inlet passageway and a separate vent passageway, one of said interchangeable assemblies having a first elongated extension electrically connected to said first electrode, a second elongated extension electrically connected to said second coaxial electrode, said second extension being parallel to and spaced from said first extension, and thin wire means extending between said electrode extensions near the free ends thereof, and the other of said interchangeable assemblies having said coaxial electrodes extending beyond said liquid-tight seal into the interior of a tubular workpiece supported in the die cavity, and means in said die head for engagement with either of said interchangeable assemblies for locking said selected assembly in place within said die head opening with said shoulder engaging said ledge.

2. In an electrohydraulic forming apparatus that includes means defining a die cavity adapted for the expansion forming of a tubular workpiece which cavity has an opening at one end thereof, the improvement comprising a die head having an opening therein which is circular in cross section and has two portions of different diameters forming a ledge in said die head opening, which ledge faces said die cavity, a pair of interchangeable electrode assemblies for insertion into the cavity through the opening, each assembly including a first electrode, a second electrode coaxial with said first electrode and disposed in surrounding relation thereto and spaced uniformly therefrom, high voltage insulation disposed between said coaxial electrodes, casting means generally surrounding said coaxial electrodes which casting means is shaped to fit into said die head opening and to have a shoulder which seats against said die opening ledge, and positioning means for insertion into one end of a tubular workpiece in the die cavity and to form a liquid-tight seal at said end, said assembly including a liquid inlet passageway and a separate vent passgeway, one of said interchangeable assemblies having a first elongated extension electrically connected to said first electrode, a second elongated extension electrically connected to said second coaxial electrode, said second extension being parallel to and spaced from said first extension, and thin wire means extending between said electrode extensions near the free ends thereof, and the other of said interchangeable assemblies having said coaxial electrodes extending beyond said liquid-tight seal provided by said positioning means and having a V-shaped groove provided in said high voltage insulation adjacent the end of said coaxial electrodes which groove increases the seal between said electrodes and said insulation at the instant of electrical discharge, and means in said die head for engagement with either of said interchangeable assemblies for locking said selected assembly in place within said die head opening with said shoulder engaging said ledge so that good support for said selected assembly is provided at the instant of electrical discharge.

3. In an electrohydraulic forming apparatus that includes means defining a die cavity having an opening therein, the improvement comprising an electrode assembly including a first electrode, a second electrode coaxial with said first electrode and disposed in surrounding relation thereto and spaced uniformly therefrom and high voltage insulation disposed between said coaxial electrodes, a plurality of flexible coaxial power transmission cables for connection to an energy storage unit, each cable including a first conductor, a layer of high-voltage insualtion around said first conductor, a tubular conductive conduit disposed about said insulation layer, a portion of the end of said tubular conduit being removed to shorten said conduit, an electrode terminal assembly which connects said plurality of cables to said electrode assembly, said terminal assembly including an insulating plate having a plurality of apertures therein, said longer first conductor of each cable extending through said insulating plate, first connector means including first means clamped about said plurality of first conductors electrically interconnecting said conductors and second clamp means for removably clamping about said first electrode, said first and second clamp means being electrically interconnected, second connector means including third means clamped about the end of each of said plurality of tubular conduits electrically connecting said conduits and fourth clamp means for removably clamping about said second coaxial electrode, said third and fourth clamp means being interconnected, and a die head adapted to move back and forth to open and close the opening in the die cavity, said die head having void space therein for accommodating said electrode assembly and means for locking said electrode assembly in desired location and orientation therein.

4. In an electrohydraulic forming apparatus that includes means defining a die cavity having an opening therein, the improvement comprising an electrode assembly including a first electrode, a second electrode coaxial with said first electrode and disposed in surrounding relation thereto and spaced uniformly therefrom and high voltage insulation disposed between said coaxial electrodes, a plurality of flexible coaxial power transmission cables for connection to an energy storage unit, each cable including a first tubular conductive conduit, a layer of high-voltage insulation around said first conduit, a second tubular conductive conduit disposed about said insulation layer, a portion of the end of said second conduit being removed to shorten said conduit, a rigid supporting plug disposed in the end of said first tubular conduit, and a tubular terminal disposed about the end of said first tubular conduit and deformed onto the end of said first tubular conduit wherein said supporting plug is disposed, an electrode terminal assembly which connects said plurality of cables to said electrode assembly, said terminal assembly including an insulating plate having a plurality of apertures therein, said longer first conduit of each cable extending through said insulating plate, a tubular support member disposed interior the end of each of said second conduits in a recess provided in said insulation thereof, first connector means including first means clamped about the exterior surface of said plurality of tubular terminals electrically interconnecting said terminals and second clamp means for removably clamping about said first electrode, said first and second clamp means being electrically interconnected, second connector means including third means clamped about the end of each of said plurality of second conduits electrically connecting said second conduits and fourth clamp means for removably clamping about said second electrode, said third and fourth clamp means being interconnected, and a die head adapted to move back and forth to open and close said opening in the die cavity, said die head having void space therein for accommodating said electrode assembly and means for locking said electrode assembly in desired location and orientation therein.

5. In an electrohydraulic forming apparatus that includes means defining a die cavity having an opening therein, the improvement comprising a pair of interchangeable electrode assemblies each including a first electrode, a second electrode coaxial with said first electrode and disposed in surrounding relation thereto and spaced uniformly therefrom, high voltage insulation disposed between said coaxial electrodes, casting means generally surrounding said coaxial electrodes, and positioning means for insertion into one end of a tubular workpiece in the die cavity and to form a liquid-tight seal at said end, said assembly including a liquid inlet passageway and a separate vent passageway, one of said interchangeable assemblies having a first elongated extension electrically connected to said first electrode, a second elongated extension electrically connected to said second coaxial electrode, said second extension being parallel to and spaced from said first extension, and thin wire means extending between said electrode extensions near the free ends thereof, and the other of said interchangeable assemblies having said coaxial electrodes extending beyond said liquid-tight seal provided by said positioning means and having a V- shaped groove provided in said high voltage insulation adjacent the end of said coaxial electrodes which groove increases the seal between said electrodes and said insulation at the instant of electrical discharge, a plurality of flexible coaxial power transmission cables for connection to an energy storage unit, each cable including a first tubular conductor, a layer of high-voltage insulation around said first conductor, a tubular conductive conduit disposed about said insulation layer, a portion of the end of said second conduit being removed to shorten said conduit, an electrode terminal assembly which connects said plurality of cables to said electrode assembly, said terminal assembly including an insulating plate having a plurality of apertures therein, said longer conductor of each cable extending through said insulating plate, a tubular support member disposed interior the end of each of said conductive conduits in a recess provided in said insulation thereof, first connector means including first means clamped about said plurality of first conductors electrically interconnecting said conductors and second clamp means for removably clamping about said first electrode, said first and second clamp means being electrically interconnected, second connector means including third means clamped about the end of each of said plurality of second conduits electrically connecting said second conduits and fourth clamp means for removably clamping about said second electrode, said third and fourth clamp means being interconnected, and a die head adapted to move back and forth to open and close said opening in the die cavity, said die head having void space therein for accommodating either of said electrode assemblies and means for locking said selected electrode assembly in desired location and orientation therein.

References Cited

UNITED STATES PATENTS

| | | | |
|---|---|---|---|
| 2,608,186 | 8/1952 | Hudson | 123—169 |
| 3,188,844 | 6/1965 | Schwinghamer | 72—56 |
| 3,222,902 | 12/1965 | Brejcha et al. | 72—56 |
| 3,225,252 | 12/1965 | Schrom et al. | 29—421 |
| 3,234,429 | 2/1966 | Shrom | 29—421 |

OTHER REFERENCES

Space Aeronautics, "in-plant explosive forming," pp. 99–100; vol. 32, No. 2, February 1960, Copy Available Group 32.

Machinery, "Electrohydraulic Forming," by R. J. Schwinghamer, pp. 85–89, vol. 70, No. 1, September 1963.

RICHARD J. HERBST, *Primary Examiner.*